United States Patent
Yachin et al.

(10) Patent No.: US 11,868,409 B2
(45) Date of Patent: Jan. 9, 2024

(54) SOCIAL NETWORK SEARCHING WITH BREADCRUMBS

(71) Applicant: TRANSFORM SR BRANDS LLC, Hoffman Estates, IL (US)

(72) Inventors: Avital Yachin, Bet-Lehem-Haglilit (IL); Sagie Davidovich, Nesher (IL); Tal Kedar, Tel Aviv (IL); Yaron Fishman, Ramat Gan (IL); Liad Agmon, Tel Aviv (IL)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 1289 days.

(21) Appl. No.: 16/398,654

(22) Filed: Apr. 30, 2019

(65) Prior Publication Data

US 2019/0324993 A1     Oct. 24, 2019

Related U.S. Application Data (63) Continuation of application No. 12/011,106, filed on Jan. 23, 2008, now Pat. No. 10,275,524.

(51) Int. Cl.
| | |
|---|---|
| *G06F 16/90* | (2019.01) |
| *G06F 16/951* | (2019.01) |
| *G06F 16/248* | (2019.01) |
| *G06F 16/904* | (2019.01) |

(52) U.S. Cl.
CPC .......... *G06F 16/951* (2019.01); *G06F 16/248* (2019.01); *G06F 16/90* (2019.01); *G06F 16/904* (2019.01)

(58) Field of Classification Search
None
See application file for complete search history.

(56) References Cited

U.S. PATENT DOCUMENTS

| | | | |
|---|---|---|---|
| 6,405,245 B1 | 6/2002 | Burson | |
| 6,618,717 B1 | 9/2003 | Karadimitriou | |
| 6,965,857 B1 | 11/2005 | Decary | |
| 6,983,282 B2 | 1/2006 | Stern | |
| 7,054,885 B1 | 5/2006 | Hoffman | |
| 7,065,483 B2 | 6/2006 | Decary | |
| 7,693,842 B2 * | 4/2010 | Hinckley | G06V 30/1914 382/187 |
| 7,761,812 B2 * | 7/2010 | Ostojic | H04N 21/4316 715/767 |
| 7,818,683 B2 * | 10/2010 | Sorin | G06F 16/954 715/768 |
| 8,224,964 B1 * | 7/2012 | Fredrickson | H04L 67/1097 709/227 |
| 8,332,895 B2 * | 12/2012 | Nathan | G06F 16/686 707/738 |

(Continued)

*Primary Examiner* — Eliyah S. Harper
(74) *Attorney, Agent, or Firm* — McAndrews, Held & Malloy, Ltd.

(57) ABSTRACT

A method for data presentation includes assembling a set of documents in response to a search query by a user having a social network. A respective person is identified with each of a group of documents in the set. For at least one document in the group, a chain of one or more links is found in the social network between the respective person and the user. A search results page is displayed, including an identification of the at least one document together with a sequence of breadcrumbs corresponding to the one or more links in the chain.

20 Claims, 5 Drawing Sheets

(56) References Cited

U.S. PATENT DOCUMENTS

| | | | |
|---|---|---|---|
| 8,352,549 B2* | 1/2013 | Sacco | G06F 16/951 |
| | | | 709/204 |
| 2006/0242130 A1* | 10/2006 | Sadri | G06F 16/951 |
| 2007/0100805 A1* | 5/2007 | Ramer | G06F 16/951 |
| 2007/0180051 A1* | 8/2007 | Kelly | H04L 67/02 |
| | | | 709/217 |
| 2007/0281689 A1* | 12/2007 | Altman | H04L 51/222 |
| | | | 455/435.1 |
| 2008/0172407 A1 | 7/2008 | Sacks | |
| 2008/0319943 A1 | 12/2008 | Fischer | |
| 2009/0063990 A1* | 3/2009 | Morris | G06F 16/951 |
| | | | 715/751 |
| 2009/0083314 A1* | 3/2009 | Maim | G06F 40/194 |
| 2009/0089678 A1* | 4/2009 | Sacco | G06F 16/285 |
| | | | 715/733 |
| 2009/0094224 A1* | 4/2009 | Ricket | G06F 16/951 |
| | | | 707/999.005 |
| 2010/0049695 A2* | 2/2010 | Morsa | G06Q 30/02 |

\* cited by examiner

SOCIAL NETWORK SEARCHING WITH BREADCRUMBS

CROSS-REFERENCE TO RELATED APPLICATIONS/INCORPORATION BY REFERENCE

The present application is a continuation of U.S. application Ser. No. 12/011,106, filed Jan. 23, 2008, now U.S. Pat. No. 10,275,524. The above-identified application is hereby incorporated herein by reference in its entirety.

FIELD OF THE INVENTION

The present invention relates generally to searching a corpus of documents, and specifically to improving the utility of searching and search results.

BACKGROUND OF THE INVENTION

Search engines provide an interface to a group of items that enables users to specify criteria about an item of interest and to have the engine find the matching items. The criteria are referred to as a search query. In the case of text search engines, the search query is typically expressed as a set of words that identify the desired concept that one or more documents may contain. Text search engines are described, for example, in a dissertation by Voorhees entitled "Natural Language Processing and Information Retrieval," (National Institute of Standards and Technology, 2000).

The World Wide Web (web) provides a large collection of interlinked information in various sources including documents, images, and media content relating to nearly every subject. Early web search engines provided basic algorithmic search, followed by paid search business models to fuel innovation. The third era of web searching is social search, harnessing human decision making to provide the most important and subjective feature in search results, relevance. Inferring each user's intent from an average of only 2.1 search terms remains at the core of the relevance challenge, as described in "The Impending Social Search Inflection Point, 2007," an article available at the Search Engine Land web site (searchengineland.com). The article notes that after "on-the-page" and "off-the-page" criteria, web connectivity and link authority, relevance is now increasingly augmented by implicit and explicit user behaviors, social networks and communities.

US Patent Application Publication 2006/0235873, whose disclosure is incorporated herein by reference, describes a method for filtering internet content responsively to a search query message based upon the user's web filters as well as the web filters of other selected users. The web experiences of a number of individuals that the user selects as reflective of the user's own preferences are leveraged to formulate an algorithm reflecting the user's preferences. The collective experience of a whole social network rapidly populates a filter to build a greater likelihood of locating information that will satisfy a user's needs according to his or her preferences.

SUMMARY OF THE INVENTION

In an embodiment of the present invention, a method is provided for data presentation. The method includes assembling a set of documents in response to a search query by a user having a social network and identifying a respective person with each of a group of the documents in the set. A chain of one or more links in the social network between the respective person and the user is found for at least one document in the group. A search results page is displayed, including an identification of the at least one document together with a sequence of breadcrumbs corresponding to the one or more links in the chain.

Typically a profile of the respective person is displayed.

In some embodiments, displaying the search results page may include adding to the search results page at least one further document from the set for which no respective chain of the links in the social network has been found. Typically, at least one of the links is an explicit link identified by a member of the social network.

In disclosed embodiments, finding the chain includes identifying an implicit link in the chain between the respective person and the user, and displaying the search results page includes displaying a breadcrumb corresponding to the implicit link. Displaying the breadcrumb may include marking the breadcrumb so as to distinguish the implicit link from an explicit link.

In some embodiments, identifying the implicit link includes assessing a level of confidence that a person associated with one of the links in the chain is identical to an individual who is known to be in the social network, and displaying the search results page includes displaying a breadcrumb so as to indicate the assessed level of confidence.

In some embodiments, identifying the implicit link includes identifying a social grouping with which both the respective person identified with the at least one document and an individual who is known to be in the social network are associated, and the implicit link is incorporated in the chain in response to the social grouping.

Typically, displaying the search results page includes delineating a relationship between the at least one document and the respective person.

In some embodiments, respective profiles of one or more people in the social network are assembled in response to the search query, and displaying the search results includes incorporating a reference to at least one of the people in the search results page.

In a disclosed embodiment of the present invention a method is provided for data presentation, including collecting a set of documents in response to a search query by a user and identifying a respective person with at least one document in a group of the documents in the set, independently of any interaction between the user or the respective person with the at least one document, and displaying a search results page including an identification of the at least one document together with a reference to the respective person. Typically, displaying the search results page includes displaying a profile of the respective person.

There is further provided, according to an embodiment of the present invention, apparatus for data presentation, including:

an interface, which receives a search query submitted by a user having a social network; and a processor, which is configured to assemble a set of documents in response to the search query, to identify a respective person with each of a group of the documents in the set, to find a chain of one or more links in the social network between the respective person and the user for at least one document in the group, and to output for display a search results page including an identification of the at least one document together with a sequence of breadcrumbs corresponding to the one or more links in the chain.

An embodiment of the invention provides a computer software product including a tangible computer-readable medium in which program instructions are stored, which instructions, when read by a server, cause the computer to assemble a set of documents in response to a search query by a user having a social network, to identify a respective person with each of a group of the documents in the set, to find a chain of one or more links in the social network between the respective person and the user for at least one document in the group, and to output for display a search results page including an identification of the at least one document together with a sequence of breadcrumbs corresponding to the one or more links in the chain.

The present invention will be more fully understood from the following detailed description of the embodiments thereof, taken together with the drawings in which:

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Given the billions of documents currently available on networks such as the web, the primary goal of a successful search result provider is to enable users to quickly and easily locate the desired information they are trying to find. Embodiments of the present invention map the knowledge that is associated with different people, and arrange the knowledge into a usable structure, allowing users to discover the knowledge and to access the relevant people who have provided it.

Two users who enter the same search query keyword "sofa" may have different goals for their respective searches. The first user may wish to find a conveniently located or attractively priced sofa to purchase while the second user is interested in the history of sofa manufacture. Some embodiments of the present invention employ user relationships to provide search results with a significant likelihood of providing information about documents and people that meets user search goals.

For example, assume PersonA works with PersonB at the same office. PersonA is interested in purchasing a used sofa. PersonB has a friend named PersonC and also has an implicit relationship with her on a social networking web site such as Facebook©, where she published that she is selling her sofa and has posted some pictures of the second-hand sofa on the web site. PersonB is not necessarily aware that his friend PersonC wishes to sell her sofa. PersonA performs a search via a search application that embodies the present invention. The search results will include PersonC's user profile from the social networking web site in addition to pictures of the sofa that she has for sale, and a description of the chain of social links connecting PersonA and PersonC via PersonB.

Embodiments of the present invention use links in a user's social network to enhance the usefulness of search results. In the context of the patent application and claims, the term "social network" is used broadly to mean not only networks of explicit links between people, such as the above-mentioned social networking web site, but also to include implicit links inferred from characteristics such as common membership in a social grouping.

In embodiments of the present invention, the chain of social links is described using a sequence of "breadcrumbs." Each breadcrumb is a textual or graphical indicator corresponding to one of the links in the chain between the user who submitted the query (PersonA) and the person (Person C) associated with the document that was found in the search (the sofa pictures). The breadcrumbs enable PersonA to see that PersonC is a friend of PersonA's co-worker PersonB, which may add a significant degree of confidence to PersonA that he has been provided with a meaningful search result and may be useful to PersonA in exploiting the search result (for example, to buy the sofa in the current scenario).

This sort of presentation of search results requires knowledge of the social networks of users who submit queries and knowledge of the documents that have been created by or are otherwise associated with people in the social network. In the context of the web, any suitable methods of web searching and crawling may be used to collect the necessary information. Furthermore, the methods of information collection and presentation that are described herein may similarly be extended to search contexts that are not web-based.

In some embodiments of the present invention, an index is built to assemble the profiles of people, herein called a Profile Index (PI). A "people-focused" web crawler is used to collect data from content servers connected to a network, such as the web. A web crawler is a program or automated script which browses content providers on a network such as the web in a methodical, automated manner. For example, U.S. Pat. No. 6,021,409, whose disclosure is incorporated herein by reference, describes a commonly used system for crawling content items. Personal information is extracted by the web crawler from social networking sites focusing upon interpersonal associations and identifier proximity, in addition to other methods known in the art for deriving relationship context. A "fusion" process is employed to identify properties such as email addresses that are likely to be unique and to determine when properties are unique enough. A determination of uniqueness may also be made during the fusion process, such as whether people with similar names are the same person, based upon their attributes and the network type. Any and all available public, private, or user-contributed information may be extracted and used to assemble the Profile Index containing links to profiles and relationships between them.

A second index is built to assemble links to documents created or annotated by people, herein called a Document Index (DI). Web crawlers are used to collect data regarding content associated with the people whose relationships are mapped. Content may include, but is not limited to, items such as written documents, web pages, weblogs (blogs), comments, pictures and videos that have been uploaded to a content server. Any link between a person and a document, including any and all available public, private, or user-contributed information may be extracted and used to assemble the Document Index containing links to documents.

A set of link files store explicit links between respective people and content. These files may be generated using any suitable method known in the art. (Generation of these files is beyond the scope of the present invention.) The Explicit Link (EL) files comprise:

- A Person_to_Person links file stores explicit links between a person and other people, derived from social networks, email contacts, and other content identifiers.
- A Person_to_Content links file stores explicit links between a person and documents that he or she has created, commented upon, or is related to in some fashion.
- A Person_to_Group links file stores explicit links between a person and group entities with which the person is associated, such as a university, workplace, or interest group.
- A Content_to_Content links file stores explicit links between content items, such as a photograph album and the pictures it contains, or a blog and the blog posts that it contains.

In some embodiments of the present invention, when a user logs in to the personalized social search system, a Related People Map (RPM) is generated. First, explicit links between the user and other people are added to the map. Explicit links may include email contacts, friends identified through a social network, and friends of friends (also known as second-degree relationships or friends), and optionally relationships of third and higher degrees. (The term "friends" is used herein to denote any person who is explicitly linked to the person in question, in accordance with accepted usage in the field of social networks.) Next, implicit links between the user and other people are added to the map, based upon common properties and social groupings. Implicit links may include sharing a common workplace, interest, profession, university, club, or geographic location. Finally, "fuzzy" links are added to the map. Fuzzy links may include links such as identification of a person as likely to be another instance of the same person, such as when they share the same name or email address.

After the RPM is generated, a Document Map (DM) is also generated for the user during the login process. The DM is generated by adding all documents that are explicitly linked to any of the people in the user's RPM. Explicit links between a person in the RPM and a document may comprise:

- A person in the RPM is the author of the document
- A person in the RPM commented on the document
- A person in the RPM bookmarked the document
- A person in the RPM is mentioned in the document When the user then submits a search query, the EL files and the RPM and DM maps are used in generating the search results and the corresponding breadcrumbs for each result. In other words, a combination of person-to-person and person-to-document links is used to generate a sequence of breadcrumbs between a search user and a search result document or profile.

Specifically, a user may perform a search by submitting several query keywords as a search query. In response, a set of documents may be returned by the search engine, comprising a list of search results which are a subset of the Document Index (DI). Each document in the search result list is compared with the Document Map (DM) for the user. If matches are found, whereby documents in the search results from the DI are also found in the user DM, the path to the matching document is generated, including each link between the user and the result document, providing a sequence of document breadcrumbs.

The submitted search query may also be used to search the Profile Index (PI). A set of profiles may be returned by the search engine, comprising a list of search results which are a subset of the PI. Each document in the search result list is compared with the Related People Map (RPM) for the user. If matches are found, whereby profiles in the search results from the PI are also found in the user RPM, the path to the matching profile is generated, including each link between the user and the result profile, providing a sequence of profile breadcrumbs.

A search result display is prepared, either for the first page of search results, or to present all of the relevant results in a single page. (For this purpose, the search result documents and profiles may be sorted and ranked, but these features of the search process are beyond the scope of the present invention.) Typically, for each result document, a title, a Uniform Resource Locator (URL), and a snippet are determined. The snippet is an extract from the result document that provides a small amount of text from the document which usually includes at least one search query keyword. An associated profile is extracted, representing the respective person associated with the result document. Breadcrumbs are generated for each result document, based on the chain of links between the user and the result document. For each result profile, breadcrumbs are also generated to represent the chain of links between the user and the result profile. The first page of search results is then displayed, comprising search result documents, profiles, and breadcrumbs. The same search result display process may also be used when the user chooses to view additional result pages. Alternatively, the search results may not be separated into multiple pages, but rather displayed in their entirety on an endless scrolling page (as demonstrated at the Microsoft Live Search web site, live.com).

As noted above, the user may be provided with search result documents, profiles, and breadcrumbs for each search result. An embodiment of the invention provides breadcrumbs that visually display how the user is related to the result documents and people. The user may then make better informed judgments regarding the usefulness of each search result.

System Description

Figure 1:
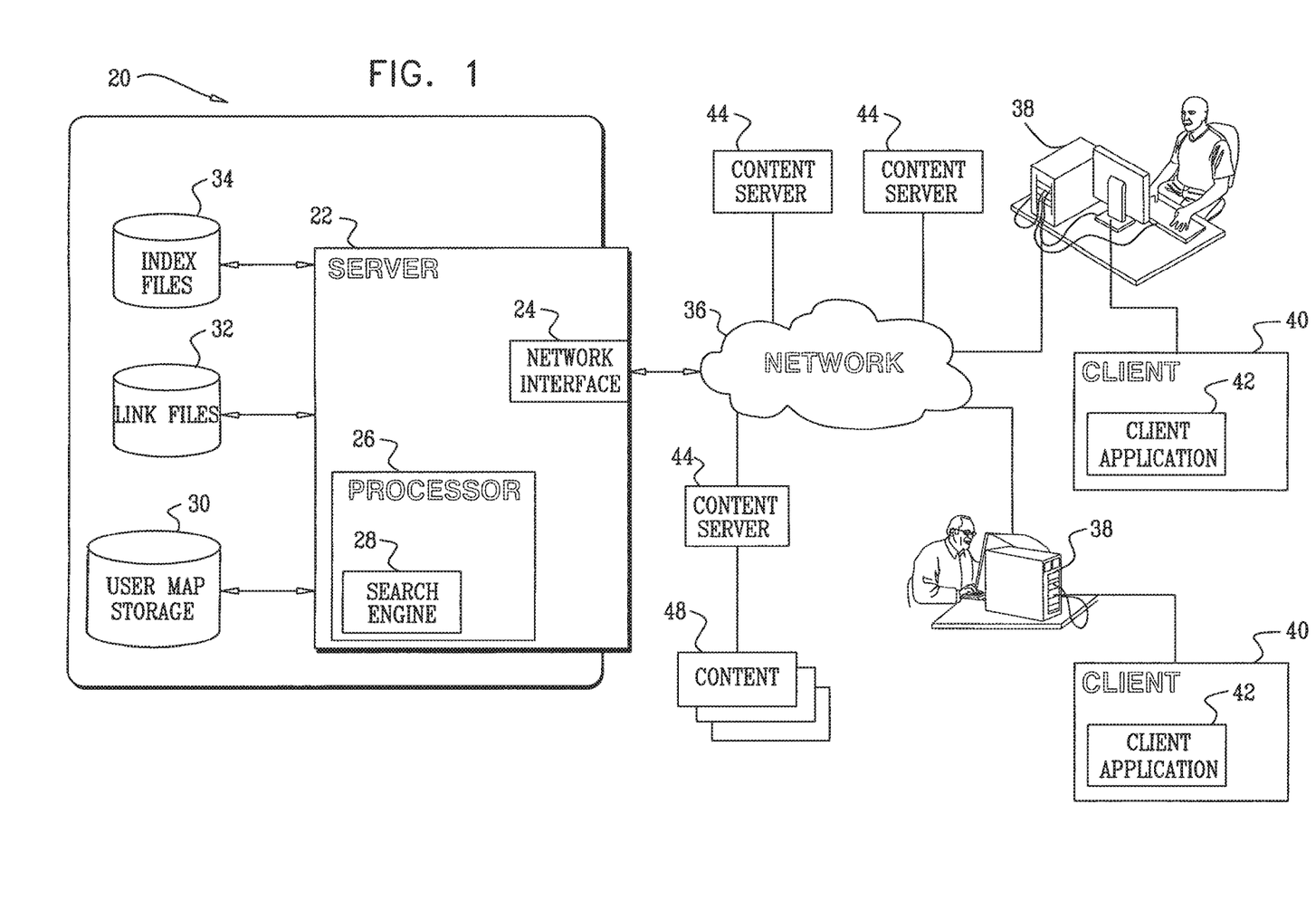
FIG. 1 is a block diagram that schematically illustrates a social-network based search system, in accordance with an embodiment of the present invention.

FIG. 1 is a block diagram that schematically illustrates a social-network based search system 20, in accordance with an embodiment of the present invention. A search provider server 22 and clients 40 communicate over a network 36, such as the Internet. Clients 40 may include any suitable computer systems 38 that are known in the art, and may include a processor, a memory, and a network interface (not shown). Suitable computer systems may include, but are not limited to, a desktop personal computer, laptop personal computer, mobile device, Internet device, hand-held personal computer, Personal Digital Assistant, or tablet personal computer. For the embodiment described below, the client should have software installed including a compatible web browser and software or hardware that provide the ability to transmit and receive data over network 36. The network provides communication channels between clients 40, content servers 44, search provider server 22, and other data sources.

The content servers may host content items 48, accessible to clients 40 over network 36. Each content item may include one or more pieces of content, such as written documents, web pages, weblogs (blogs), comments, pictures and videos. Clients 40 use a client application 42, such as a web browser, to request the content item from content servers 44, by sending a unique address, such as a Uniform Resource Locator (URL). The client application receives the content item and displays the content item pointed to by the URL.

Search provider server 22 may comprise any device that can receive search keywords from the client via a network interface 24, and can transmit search results in response to a client search request received from the network. An embodiment of the present invention is described hereinbelow as a convenient way to implement the search system by storing maps, link files and index files separately. However, other different configurations and implementations may be used. The search provider server is herein assumed to include a processor 26, which runs a search engine 28. The server is connected to storage media containing a user map storage 30, link files 32, and index files 34 by any suitable means known in the art, such as through a bus (not shown). The link files store explicit links between respective people and content. The index files comprise the Document Index (DI) and the Profile Index (PI). The DI stores links to documents created or annotated by people. The PI stores the profiles of people. Both the link files and the index files are described in more detail in the Overview section above.

Processor 26 typically comprises a general-purpose computer processor, which is programmed in software to carry out the functions that are described herein. The software may be downloaded to the processor in electronic form, over a network, for example. Alternatively or additionally, the software may be provided on tangible media, such as optical, magnetic, or electronic storage media. Further alternatively, at least some of the functions of the processor may be carried out by dedicated or programmable hardware.

When a user operating client 40 wishes to perform a search for specific content items on network 36, the user operates client application 42 to retrieve a markup-language page from search provider server 22. The markup-language page contains a search string entry form, described below in reference to FIG. 5, for entering search keywords. The user enters a search string, consisting of one or more keywords, as a search query. The search query is sent to search engine 28 on the search provider server. The search engine searches through the document and profile indices for documents and profiles that satisfy the user search query, as detailed below. Breadcrumbs are prepared for the first page of search results, and the search results and associated breadcrumbs are returned to client 40. The client application displays the search results and breadcrumbs to the user. The user may then choose to display a complete search result content item, to display additional results, or to modify the search keywords and perform a new query, inter alia.

In an alternative embodiment of the present invention, the search results may not be separated into multiple pages, but rather displayed in their entirety on an endless scrolling page as described in the Overview section.

Figure 2:
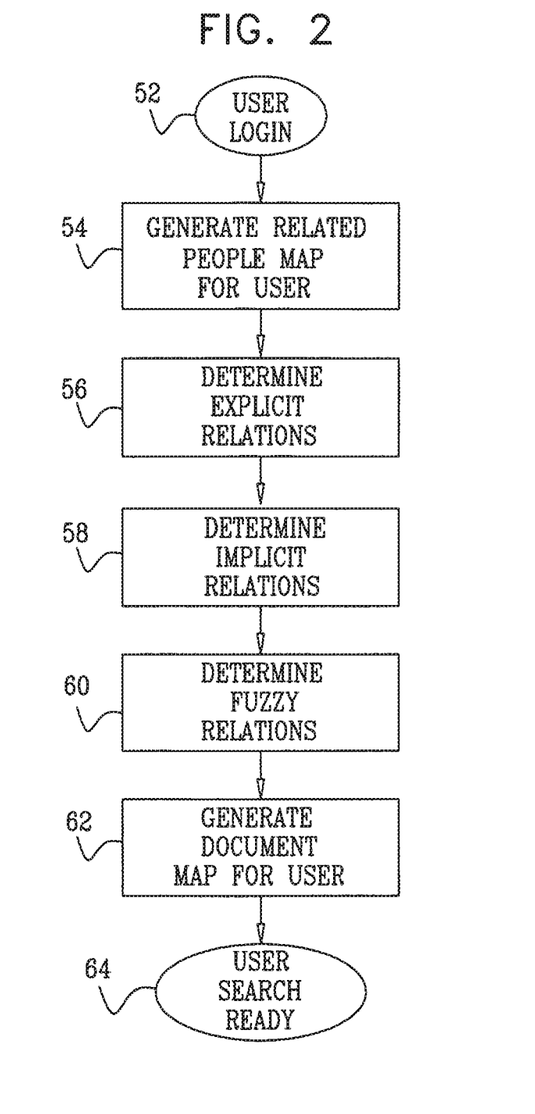
FIG. 2 is a flow chart that schematically illustrates a method for generation of user map files, in accordance with an embodiment of the present invention.

Reference is now made to FIG. 2, which is a flow chart that schematically illustrates a method for generation of user map files, in accordance with an embodiment of the present invention. In a user logging in step 52, the user operates client application 42 to log in to search provider server 22. The user may enter a username and password, or alternatively, a stored cookie may be used to log the user in automatically when the user connects the client application to the search provider server using any standard method known in the art. Map files may also be generated or updated for the user automatically, based upon his or her profile, without requiring any user activity such as logging in to the client application.

In a Related People Map (RPM) generation step 54, an RPM is generated that comprises all of the people profiles that are related to the user. The RPM contains links between the user and his friends, in addition to links between the user's friends and their own friends. The RPM links are derived from explicit, implicit, and fuzzy relationships. Derivation of these relationships is described, for the sake of clarity, in separate steps that follow step 54 in FIG. 2, although in reality, step 54 encompasses the subsequent steps.

In an explicit relation determination step 56, explicit relationships are determined for this user. Explicit relationships may comprise, for example, contacts stored in an email application address book or contacts listed as friends on a social networking web site. Links between the user and the explicitly related friends are added to the RPM. Friends and other people at an additional degree of separation are added to the original list of explicitly related friends. The friends and contacts of each explicitly related friend are extracted and added to the RPM.

In an implicit relation determination step 58, implicit relationships are determined for this user. Implicit relationships refer to social groupings to which the people in the social network may belong. Such social groupings may comprise, for example, people who have attended the same school as the user, who have worked at the same workplace, or who are members of the same club. Various other social groupings may be used to determine implicit relationships, such as shared profession or geographic location. Links between the user and the implicitly related friends are added to the user RPM. Friends at an additional degree of separation are added to the original list of implicitly related friends. The friends and contacts of each implicitly related friend are extracted and added to the RPM.

In a fuzzy relation determination step 60, "fuzzy" relationships are determined for the user. Fuzzy relationships, in the context of the present patent application and in the claims, are considered to be another type of implicit relationships. Fuzzy identification is used to add people to the RPM who may be friends. Fuzzy identification comprises the process of identifying that two instances of a person may be the same person through common attributes such as having identical names. When there is a high degree of confidence that a person in a group or social networking site is the same as a friend of the user, the person, their documents, and their friends and documents are added to the user RPM. Friends at an additional degree of separation are added to the original list of fuzzily related friends. The friends and contacts of each fuzzily related friend are extracted and added to the user RPM. The level of confidence associated with each such fuzzy relationship may also be stored in the RPM.

By the same token, it is possible to add to the RPM people who are implicitly related to any of the friends found in steps 56, 58 and 60. The number of degrees of relationship and the types of relationships that are used in extending the RPM may be determined by the operator of server 22, depending on how large a social network is to be used in generating the search results.

In a document map generation step 62, references to all documents that are explicitly related to the people in the RPM are assembled. Paths to the documents are used to generate a Document Map (DM) for the user. Paths between the user and the documents in the DM comprise chains of links between people and between people and documents. Some example paths include:

User->Friend(social networking site/explicit)->Friend commented on a blog

User->Group(workplace)->Friend(implicit)->$2^{nd}$ Degree Friend wrote a magazine article User->Friend(email contact)->Friend(fuzzy) uploaded a picture to a photograph sharing site After the RPM and DM have both been created, the user is provided with a search string entry form in a user search readiness step 64. The user may now enter a search query comprising keywords or a search string in order to perform a search in order to receive search results and breadcrumbs. The pseudo code from an embodiment of the present invention that may be used to generate the RPM and the DM is shown below in an Appendix.

Figure 3:
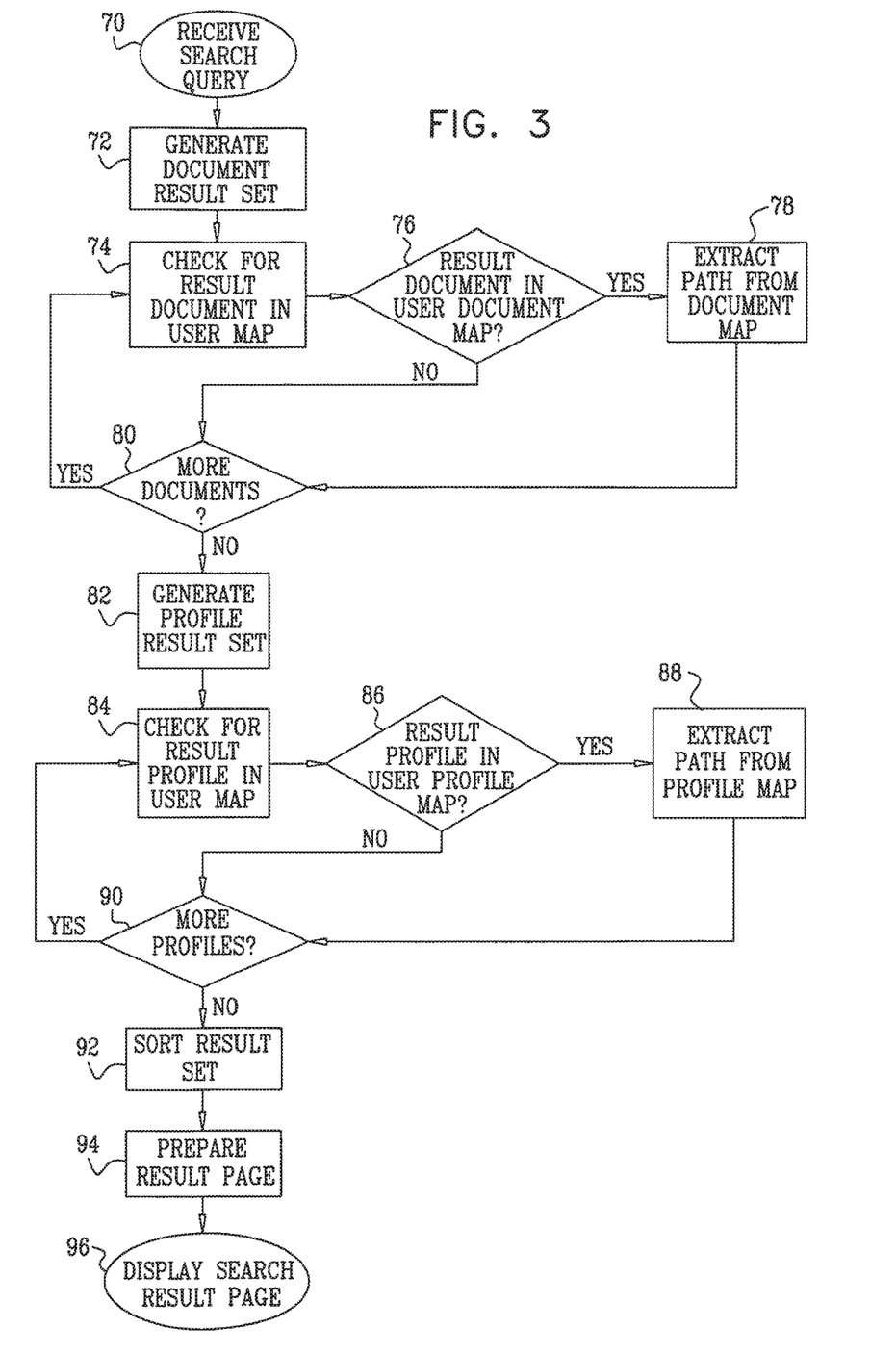
FIG. 3 is a flow chart that schematically illustrates a method for assembly of a set of documents and people in response to a user search query, in accordance with an embodiment of the present invention.

Reference is now made to FIG. 3, which is a flow chart that schematically illustrates a method for assembly of a set of documents and people in response to a user search query, in accordance with an embodiment of the present invention. In a search query receipt step 70, a search string, consisting of one or more keywords, is received from client 40 by search provider server 22 via the network as a search query.

In a document result set generation step 72, the search provider server processor submits the search query to search engine 28 (FIG. 1) to search a Document Index (DI), stored in index files 34. In some embodiments, the search engine may use the Lucene open source information retrieval library (available at the web site of the Apache Software Foundation, lucene.apache.org) in creating the DI. Lucene provides a cross-platform full text indexing and searching capability. Text from many document formats can be indexed and full text searches may be conducted to provide search results. The Document Index (DI) may thus comprise a set of documents indexed in advance by Lucene. In the present embodiment, step 72 may be implemented by applying the Lucene search engine to search the DI. The search engine responds with a set of document results in response to the search query.

Processor 26 compares each search result document with the user Document Map (DM) in storage 30, in a result document checking step 74. This step may use a bloom filter, as is known in the art, to calculate two hash values on the document ID of each document in the DI. The hash codes are truncated by modulo operation and are mapped on a bit vector. If both bits have the value "1", then the search result document exists in the DM. If the search result document is found to match a document in the DM, in a result document decision step 76; then the processor extracts the document path from the DM, in a document path extraction step 78. When there is more than one document path leading to the same document, the processor applies a selection criteria to choose one of the paths. For example, each link in path may be scored and the highest scoring path chosen. Another selection criteria could be simply choosing the shortest path. The selected path is extracted from the DM. The extracted document path comprises a chain of links, in the form of sequence of person, social grouping and document identifiers beginning with the identifier of the user performing the search and finishing with the result document identifier. The identifier sequence is used to generate a breadcrumb chain as described below with reference to FIG. 4.

Following step 76 or 78, the processor checks whether there are additional results remaining in the document result set, in an additional result document checking step 80. If additional result documents have not yet been compared with the DM, the next search result document is checked at step 74. These steps are followed until all search result documents matching DM documents have had their paths extracted.

Following on from step 80, in a profile result set generation step 82, the search provider server processor optionally submits the search query to search engine 28 (FIG. 1) to search a Profile Index (PI). User profiles may be indexed by Lucene in the PI as described above in the Overview section and stored in index files 34. Step 82 may also be implemented by submitting the search query to the Lucene search engine to search the PI. The Lucene search engine may then respond with a set of profile results in response to the search query.

Each profile result document is compared with the user RPM, in a result profile checking step 84. Processor 26 performs this step in a manner similar to step 74, as described above. If the profile result document is found to match a document in the RPM, in a result profile decision step 86, then the processor extracts the profile path from the RPM in a profile path extraction step 88. This step is carried out in a manner similar to step 78. Following step 86 or 88, the processor checks whether there are additional results remaining in the profile result set, in an additional result profile checking step 90. If additional result profiles have not yet been compared with the RPM, the next search result profile is checked for in step 84. These steps are followed until all search result profiles matching RPM documents have had their paths extracted.

Following on from step 90, in a result sorting step 92, the processor sorts the query result documents and profiles found in the user DM and RPM. This step may include, but does not require, ranking of the result documents and profiles. The relationships indicated by the breadcrumbs may also be factors used in ranking the search results. In some embodiments, the result sorting step may comprise boosting the initial document rankings supplied by the search engine so that the results will be sorted to present the most relevant results at the top of the result list, based on the links found in the DM and RPM. This sort of boosting is beyond the scope of the present invention.

In a result page preparation step 94, processor 26 prepares a markup-language page comprising result documents and profiles. The result page preparation step is described in detail below in reference to FIG. 4.

In a search result page displaying step 96, the prepared search result page is sent by search provider server 22 to client 40 and is displayed by client application 42.

Figure 4:
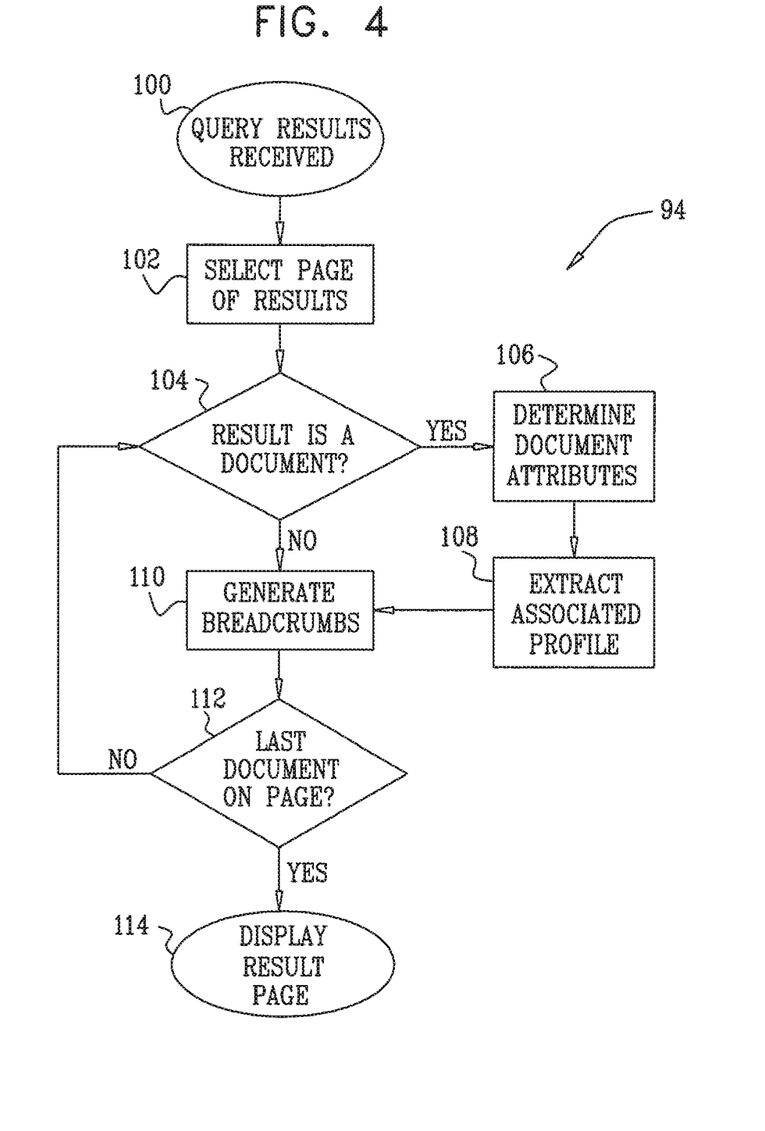
FIG. 4 is a flow chart that schematically illustrates a method for preparation of a search result page with breadcrumbs, in accordance with an embodiment of the present invention.

Reference is now made to FIG. 4, which is a flow chart that schematically shows details of the method of result page preparation that is used at step 94, in accordance with an embodiment of the present invention. Although this method is described hereinbelow with reference to the particular system and search methods that are shown above in FIGS. 1-3, the principles of the method may also be applied in generating a display of search results with breadcrumbs based on other search techniques that involve social networks.

In a query result receiving step 100, processor 26 assembles the query result documents and profiles that have been found in the user DM and RPM. In some cases, the query result documents may also include documents for which no suitable chain of links was found in the user's social network, but which were found by the search engine to be highly relevant to the search query. In a result page selection step 102, the processor selects a page of results for preparation. The number of results that can be displayed on a page may vary, depending upon the client application, screen size and resolution, user configuration, and other factors typically applicable to markup-language page display known to those skilled in the art. Alternatively, the results may all be displayed in a single scrolling page, as noted above.

In a search result document determining step 104, processor 26 checks each search result to determine whether it is a document or a profile. If the result is a document, the processor chooses the document title, URL and "snippet" in a document attribute determination step 106. In an associated profile extracting step 108, the profile associated with the result document is extracted from the RPM. This profile, as explained above, is the profile of the person in the RPM who is identified with the document in question.

Returning to step 104, when the search result is a profile, there are no additional attributes to determine.

Following from step 104 or 108, processor 26 generates search result breadcrumbs in a breadcrumb generating step 110 by extracting the breadcrumbs from the user's RPM and DM. As described above in the Overview, the search result breadcrumbs correspond to each of the links in the chain between the user who submitted the query and the person associated with the document or profile that was found in the search. The breadcrumbs chain begins with the user, displayed as "You", followed by each link between the user and the result document or profile.

For example, assume PersonA has a friend, PersonB, linked by PersonA's email contact list. PersonB has another friend, PersonC, linked by a Facebook friend list. PersonC commented on a blog about raising pets. PersonA may perform a search comprising the keywords "kitten" and "milk". The breadcrumbs between PersonA, his explicitly linked friend, PersonB, and his friend's friend PersonC, who posted a comment on a "Raising Baby Pets" blog may look like this:

You>Joe Edmonds>Facebook>Suzanne Morrison (Author)

These breadcrumbs provide PersonA with a clear understanding of his or her connection to the person associated with result document, PersonC. In some embodiments, each breadcrumb link may be a hyperlink, or a markup-language navigation element that references another document that may be provided by a different content server. PersonA may choose to follow a breadcrumb link from this example to find out more information about PersonB (Joe Edmonds), the social networking web site (Facebook), or his friend's friend, PersonC (Suzanne Morrison).

On the other hand, the links may be found and the corresponding breadcrumbs may be generated independently of any interaction between the user or the respective person with the document in question. For example, as noted above, a document may be identified with a person in the social network simply because this person is mentioned in the document.

Other sorts of breadcrumbs and further details of their presentation are shown below in FIG. 5.

When the result document is a profile, the breadcrumbs may correspond to the links between the user who has performed the search and the result profile. The user may elect to view the complete profile by clicking on the appropriate markup-language hyperlink.

Once the breadcrumbs have been generated, in a last document determining step 112, a determination is made as to whether the result document or profile is the last result that fits on the search result page. If all result documents for the search result page have been prepared, the result page is sent by the search provider server to the client in a result page displaying step 114. Of course, when the result set includes relevant documents that do not have corresponding chains of links in the social network, no breadcrumbs are displayed for these documents. The search result page may then be displayed by the client application.

Figure 5:
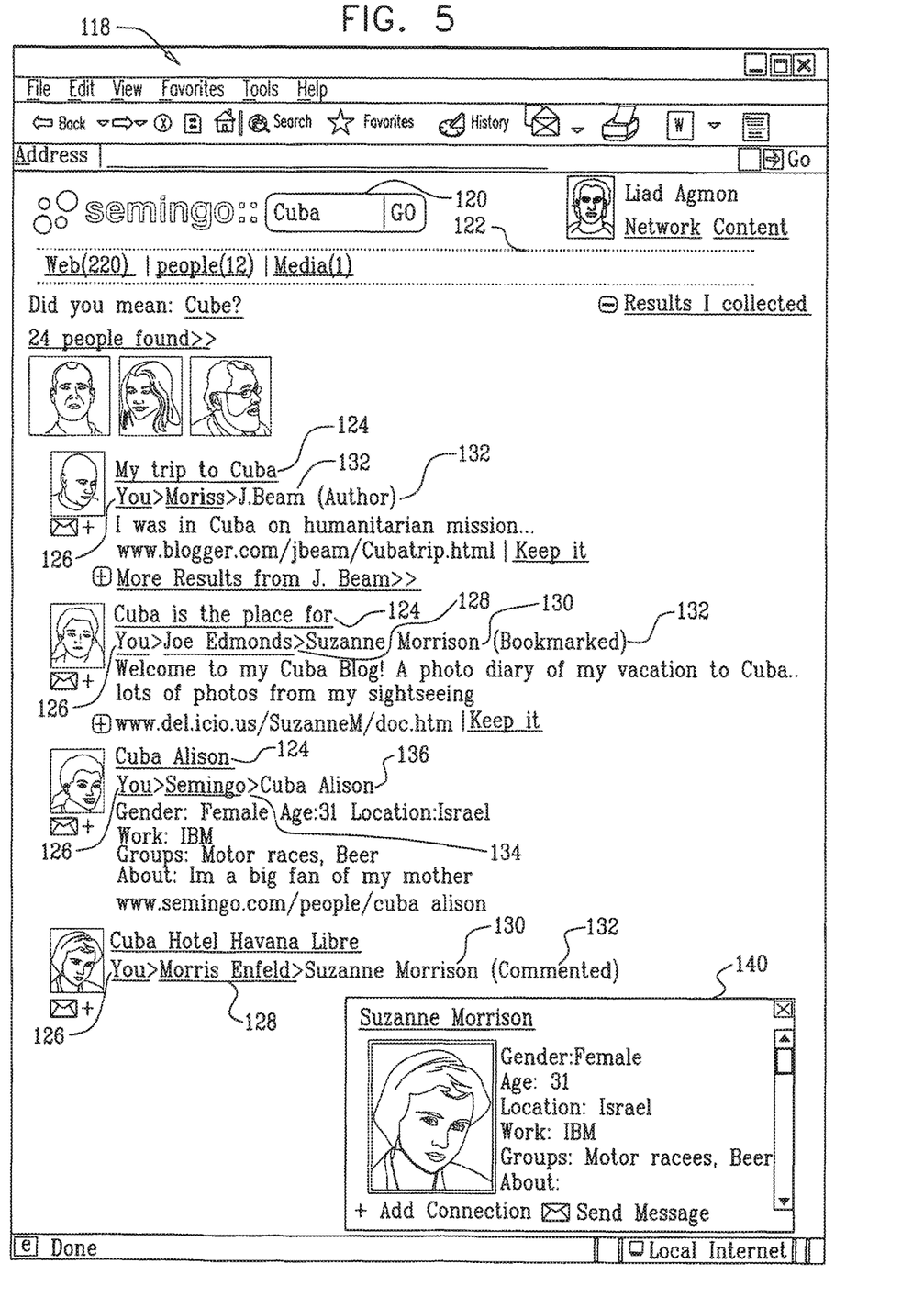
FIG. 5 is a schematic, pictorial illustration of a search result screen with breadcrumbs, in accordance with an embodiment of the present invention.

Reference is now made to FIG. 5, which is a schematic, pictorial illustration of a search result screen 118 with breadcrumbs, in accordance with an embodiment of the present invention. The user constructs a search string, or a series of keywords, entering them into a search string entry form 120. The user then submits the search string to search provider server 22, and the server responds with a search result page 122.

The search result page comprises search results 124. Each search result may be a hyperlink that the user may use to browse to the result document or profile. Each search result 124 may comprise a sequence 126 of breadcrumbs, in addition to a snippet and a link to the result document or profile. The sequence of breadcrumbs may correspond to a set of explicit and/or implicit links (including fuzzy links), or any combination thereof, between the user and the result document or profile.

An explicit breadcrumb 128, 130 may be used to display a link between the user and the identified respective person who is explicitly connected to the result document or profile, as detailed above. In this example, breadcrumb 130 corresponds to the final link in the breadcrumb sequence. The explicitly identified person may have authored, commented upon, bookmarked, or have been mentioned in the search result document. A document link type 132 is displayed to delineate the relationship between the identified person and the result document.

An implicit breadcrumb 134 may be used to display an implicit link between the user and a social grouping used to determine an implicit relationship. The implicit breadcrumb may refer to a school, social networking site, workplace, profession, club, geographic location, or any other social grouping known in the art, that implicitly links a person to the next link in the chain or to the result document or profile. Optionally, implicit breadcrumbs may be displayed in a way that distinguishes them from explicit breadcrumbs. Furthermore, when an implicit breadcrumb is associated with a relationship that was inferred by processor 26, such as a fuzzy link, the processor may display the breadcrumb in a way that indicates a degree of confidence in the link. For example, the processor may color or otherwise mark the link to indicate the level of confidence that the person identified with the document in question is identical to an individual who is known to be in the social network of the user.

The final breadcrumb in the sequence may correspond to a profile name 136. When the information is available, the profile of this person, comprising profile attributes of this person, may be displayed in a profile window 140, for example. The profile attributes may comprise the gender, age, geographic location, profession, sex, groups of interest, but are not limited to them. This profile may be available for display even when the breadcrumb to the person in question was generated independently of any interaction between the person and the document (due to a mention of the person in the document, for example).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—MAP GENERATION PSEUDO CODE

Code example I below shows pseudo code that may be used for the purpose of generating a Related People Map (RPM). Code example II below shows pseudo code that may be used for the purpose of generating a Document Map (DM). Both map files are generated when a user logs in to search provider server 22 or during an automatic update process as described in reference to FIG. 2 above.

Code Example I—RPM Generation

```
BuildRPM(ObjectID, path_start)
{
    If (IsValidPath(path_start))         // stop condition
    {
        RPM.AddPath(path_start)    // add a valid path to the
                                   // RPM
        return
    }
    If (path_start == null) AddPathSegment(path_start,
            ObjectID)     // first recursive call
    dirRelations = GetDirectRelations(ObjectID)
                                  // profiles, groups
    foreach (direct_relation in dirRelations)
    {
        If (IsValidPartialPath(path_start, direct_relation))
        {
            Path_start = AddPathSegment(path_start,
                    direct_relation)
            BuildRPM(direct_relation, path_start)
        }
    }
}
            CODE EXAMPLE II - DM GENERATION
        BuildDM(RPM)
{
Foreach (path in RPM.paths)
{
    last_person = Path.GetLastPerson( )
    Docs = GetRelatedContent(last_person)
        // any content related to the person
    foreach (item in Docs)
    {
        DM.AddPath(path, item)
    }
}
}
```

The invention claimed is:

1. A method of operating a system for performing searches for documents requested by one member of a plurality of members of an online social network, the method comprising:
in a computer system for communicatively coupling to user devices of the plurality of members of the social network and to the network of computers on which is stored a plurality of documents,
generating a plurality of first data structures, each first data structure comprising personal information of a corresponding individual;
generating a plurality of second data structures, each second data structure comprising data representing a link between a document accessible on the network of computers and a corresponding individual;
generating a third data structure for a particular user, the third data structure comprising link information representing social relationships identified between the particular user and other users of the network of computers;
creating a fourth data structure based on collecting information representing documents in the network of computers that are linked in the plurality of second data structures with those other users of the network of computers that are linked in the third data structure with the particular user;
in response to receiving a search query comprising one or more search criteria from the particular user,
generating search results identifying one or more documents identified in the plurality of second data structures that match the one or more search criteria, and
generating, for display in a sequential manner on a graphical user interface, a corresponding sequence of breadcrumbs identifying person-to-person and person-to-document links that form a chain of links between the particular user and each document of the one or more documents, based on search criteria from the particular user, the third data structure, and the fourth data structure; and
transmitting the search results and the corresponding sequence of breadcrumbs to a user device of the particular user via the network of computers, for display.

2. The method according to claim 1, wherein the personal information comprises information representative of interpersonal associations of individuals.

3. The method according to claim 1, wherein the corresponding individual identified in the plurality of first data structures created or annotated the document.

4. The method according to claim 1, wherein the social relationships are identified during generation of the third data structure based upon one or both of email contact information of the particular user and the other users of the network of computers, and information identifying friends in a social network of the network of computers.

5. The method according to claim 1, wherein the social relationships are identified during generation of the third data structure based upon one or both of common properties of the particular user and the other users of the network of computers, and social groupings of the particular user and the other users of the network of computers.

6. The method according to claim 1, wherein generating search results comprises:
comparing each document represented in the plurality of second data structures to documents represented in the fourth data structure to identify matching documents; and
creating the corresponding sequence of breadcrumbs identifying person-to-person and person-to-document links between the particular user and each matching document.

7. The method according to claim 1, wherein the personal information of the corresponding individual, and the data representing a link between a document found on the network of computers and a corresponding individual, is automatically collected from the network of computers without human intervention.

8. A system for performing searches for documents requested by one member of a plurality of members of an online social network, the system comprising:
one or more processors of a computer system for communicatively coupling to user devices of the plurality of members of the social network and to the network of computers on which is stored a plurality of documents, the one or more processor operable to, at least:
generate a plurality of first data structures, each first data structure comprising personal information of a corresponding individual;
generate a plurality of second data structures, each second data structure comprising data representing a link between a document accessible on the network of computers and a corresponding individual;
generate a third data structure for a particular user, the third data structure comprising link information representing social relationships identified between the particular user and other users of the network of computers;
create a fourth data structure by collecting information representing documents in the network of computers that are linked in the plurality of second data structures with those other users of the network of computers that are linked in the third data structure with the particular user;
in response to receiving a search query comprising one or more search criteria from the particular user,
generate search results identifying one or more documents identified in the plurality of second data structures that match the one or more search criteria, and
generate, for display in a sequential manner on a graphical user interface, a corresponding sequence of breadcrumbs identifying person-to-person and person-to-document links that form a chain of links between the particular user and each document of the one or more documents, based on search criteria from the particular user, the third data structure, and the fourth data structure; and
transmit the search results and the corresponding sequence of breadcrumbs to a user device of the particular user via the network of computers, for display.

9. The system according to claim 8, wherein the personal information comprises information representative of interpersonal associations of individuals.

10. The system according to claim 8, wherein the corresponding individual identified in the plurality of first data structures created or annotated the document.

11. The system according to claim 8, wherein the social relationships are identified during generation of the third data structure based upon one or both of email contact information of the particular user and the other users of the network of computers, and information identifying friends in a social network of the network of computers.

12. The system according to claim 8, wherein the social relationships are identified during generation of the third data structure based upon one or both of common properties of the particular user and the other users of the network of computers, and social groupings of the particular user and the other users of the network of computers.

13. The system according to claim 8, wherein generating search results comprises:

comparing each document represented in the plurality of second data structures to documents represented in the fourth data structure to identify matching documents; and
creating the corresponding sequence of breadcrumbs identifying person-to-person and person-to-document links between the particular user and each matching document.

14. The method according to claim 8, wherein the personal information of the corresponding individual, and the data representing a link between a document found on the network of computers and a corresponding individual, is automatically collected from the network of computers without human intervention.

15. A non-transitory computer-readable medium having a plurality of code sections, each code section comprising a plurality of instructions executable by one or more processors of a computer system for communicatively coupling to user devices of a plurality of members of an online social network and to a network of computers containing a plurality of stored documents, the executable instructions causing the one or more processors to perform actions of a method of operating a system for performing searches for documents requested by one member of a plurality of members of a social network, the actions comprising:
generating a plurality of first data structures, each first data structure comprising personal information of a corresponding individual;
generating a plurality of second data structures, each second data structure comprising data representing a link between a document accessible on the network of computers and a corresponding individual;
generating a third data structure for a particular user, the third data structure comprising link information representing social relationships identified between the particular user and other users of the network of computers;
creating a fourth data structure by collecting information representing documents in the network of computers that are linked in the plurality of second data structures with those other users of the network of computers that are linked in the third data structure with the particular user;
in response to receiving a search query comprising one or more search criteria from the particular user,
generating search results identifying one or more documents identified in the plurality of second data structures that match the one or more search criteria, and
generating, for display in a sequential manner on a graphical user interface, a corresponding sequence of breadcrumbs identifying person-to-person and person-to-document links that form a chain of links between the particular user and each document of the one or more documents, based on search criteria from the particular user, the third data structure, and the fourth data structure; and
transmitting the search results and the corresponding sequence of breadcrumbs to a user device of the particular user via the network of computers, for display.

16. The non-transitory computer-readable medium according to claim 15, wherein the personal information comprises information representative of interpersonal associations of individuals, or wherein the corresponding individual identified in the plurality of first data structures created or annotated the document.

17. The non-transitory computer-readable medium according to claim 15, wherein the social relationships are identified during generation of the third data structure based upon one or both of email contact information of the particular user and the other users of the network of computers, and information identifying friends in a social network of the network of computers.

18. The non-transitory computer-readable medium according to claim 15, wherein the social relationships are identified during generation of the third data structure based upon one or both of common properties of the particular user and the other users of the network of computers, and social groupings of the particular user and the other users of the network of computers.

19. The non-transitory computer-readable medium according to claim 15, wherein generating search results comprises:
   comparing each document represented in the plurality of second data structures to documents represented in the fourth data structure to identify matching documents; and
   creating the corresponding sequence of breadcrumbs identifying person-to-person and person-to-document links between the particular user and each matching document.

20. The non-transitory computer-readable medium according to claim 15, wherein the personal information of the corresponding individual, and the data representing a link between a document found on the network of computers and a corresponding individual, is automatically collected from the network of computers without human intervention.

* * * * *